(12) United States Patent
Takahashi et al.

(10) Patent No.: US 7,552,249 B2
(45) Date of Patent: Jun. 23, 2009

(54) DIRECT MEMORY ACCESS CIRCUIT AND DISK ARRAY DEVICE USING SAME

(75) Inventors: Hidenori Takahashi, Kawasaki (JP); Yuichi Ogawa, Kawasaki (JP); Terumasa Haneda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 11/239,069

(22) Filed: Sep. 30, 2005

(65) Prior Publication Data

US 2006/0143329 A1 Jun. 29, 2006

(30) Foreign Application Priority Data

Dec. 24, 2004 (JP) ............... 2004-372441

(51) Int. Cl.
*G06F 3/00* (2006.01)
*G06F 13/28* (2006.01)
(52) U.S. Cl. ............................ 710/22; 710/1
(58) Field of Classification Search ...... 710/1, 710/22
See application file for complete search history.

(56) References Cited

U.S. PATENT DOCUMENTS

| 6,954,807 | B2 * | 10/2005 | Shih ............... 710/22 |
| 7,124,258 | B2 | 10/2006 | Nakayama et al. |
| 7,421,553 | B2 | 9/2008 | Nakayama et al. |
| 2004/0199732 | A1 * | 10/2004 | Kelley et al. ......... 711/158 |
| 2005/0005066 | A1 | 1/2005 | Nakayama et al. |
| 2005/0114561 | A1 * | 5/2005 | Lu et al. .............. 710/24 |
| 2007/0011414 | A1 | 1/2007 | Nakayama et al. |

FOREIGN PATENT DOCUMENTS

| CN | 1397885 | 2/2003 |
| CN | 1519736 | 8/2004 |
| JP | 63-211032 | 8/1988 |
| JP | 03-058217 | 3/1991 |
| JP | 2001229120 | 8/2001 |
| JP | 2004-110159 | 4/2004 |
| JP | 2005-25683 | 1/2005 |

OTHER PUBLICATIONS

Office Action issued in corresponding Chinese Patent Application No. 2005100776884, on Jun. 1, 2007.

* cited by examiner

*Primary Examiner*—Niketa I Patel
*Assistant Examiner*—Richard Franklin
(74) *Attorney, Agent, or Firm*—Staas & Halsey LLP

(57) ABSTRACT

A DMA circuit prevents an erroneous data transfer by a descriptor due to an address failure of memory. When a descriptor is created, the data processing unit writes a pointer, for storing the descriptor, in a predetermined part of the descriptor, and stores the descriptor in memory, and when a DMA engine reads the descriptor from the memory, the DMA engine confirms whether the value is correct, and judges whether a DMA transfer of the data in the memory is possible. For both reading and writing of a descriptor, data corruption due to an address failure can be prevented.

20 Claims, 9 Drawing Sheets

DIRECT MEMORY ACCESS CIRCUIT AND DISK ARRAY DEVICE USING SAME

CROSS-REFERENCE TO RELATED APPLICATIONS

This application is based upon and claims the benefit of priority from the prior Japanese Patent Application No. 2004-372441, filed on Dec. 24, 2004, the entire contents of which are incorporated herein by reference.

BACKGROUND OF THE INVENTION

1. Field of the Invention

The present invention relates to a DMA (Direct Memory Access) circuit which directly accesses memory according to an external instruction and transfers data, and a disk array device using this, and more particularly to a DMA circuit which is suitable for guaranteeing the validity of the data on a disk array device to be used as an external storage device of a computer, and a disk array device using this.

2. Description of the Related Art

As various data are computerized and handled by computers, efficiently transferring a large volume of data independently from the computer is now demanded. For this, a technology to independently access the memory to store data according to an external instruction and transfer data, that is DMA (Direct Memory Access) transfer, is actively used.

In the case of a disk array device which can safely store a large volume of data, the large volume of data is read or written by access of the host computer, so the data of the memory is transferred to the host computer or internal circuit.

FIG. 9 and FIG. 10 are diagrams depicting prior art. As FIG. 9 shows, the CPU 100 writes data to the cache memory 104, the DMA circuit (engine) 102 reads the write data in the cache memory 104 and transfers it. When the CPU 100 receives the data from the external device, such as a host, the CPU 100 creates a descriptor and writes it in the control area (descriptor area) 106 created in the cache memory 104.

The descriptor is an instruction for the CPU 100 to send to the DMA engine 102, and includes the address and number of bytes of the transfer data in the cache memory 104, and address of the data transfer destination (memory). For example, as the format of the descriptor in FIG. 10 shows, the descriptor is comprised of a four word (1 word, 64 bits) command. The first word is comprised of the command field cmd, interrupt control field (e.g. "1" indicates generating an interrupt when the descriptor ends), BCC check mode BCC, transfer destination node Tgt, and transfer destination (Write Side) memory address DDA.

The second word is comprised of the number of transfer bytes SIZE (e.g. max. 1 Mbytes, min. 8 bytes), and transfer source (Read Side) memory address SDA. The third word is the Block-ID initial value for checking Check BKID, and the fourth word is the Block-ID initial value for generation (Replace).

The CPU 100 creates the descriptor shown in FIG. 10 each time data is written to the cache memory 104, and writes it in the descriptor area 106 in the cache memory 104. A memory area, which is N times the descriptor size, is allocated for the descriptor area 106.

The CPU 100 also writes the first address of the descriptor area 106 itself in the descriptor base address register 110 of the DMA engine 102 when DMA is started up. By this, the DMA engine 102 can know the address of the cache memory 104 from where the descriptor is written.

This DMA engine 102 has a descriptor top pointer register 112 and descriptor bottom pointer register 114. These registers 112 and 114 indicate the number of descriptor that the CPU 100 provided in the descriptor area 106, and the number of descriptors of which the DMA engine 102 ended execution respectively. In other words, the top register 112 indicates the first descriptor (descriptor #5 in FIG. 9), and the bottom register 114 indicates the last descriptor (descriptor #1 in FIG. 9).

A continuous space from the address indicated by the descriptor base address register 110 to N times of one descriptor size is used as the descriptor area 106. In the case of the example in FIG. 9, the CPU 100 creates six descriptors, #0-#5, and stores them in the descriptor area 106, then advances the value of the descriptor top pointer register 112 of the DMA engine 102 to "6". By this, the DMA engine 102 knows that the descriptors are prepared, and starts reading the descriptors from the last descriptor (e.g. see Japanese Patent Application Laid-Open No. S63-211032, and Japanese Patent Application Laid-Open No. 2004-110159).

In other words, the DMA engine 102 reads the descriptor from the position indicated by the descriptor bottom pointer register 114 of the descriptor area 106, analyzes it, and increments the descriptor bottom pointer register 114 by "1" when the specified data transfer completes. FIG. 9, for example, shows the case that the descriptor bottom pointer register 114 is "1", and that the processing of the descriptor #0 has already been completed.

The data itself has a check code to be guaranteed and the data of the cache memory also has an ECC (Error Check Code), and corruption of data due to an abnormality of the data path between the DRAM (Dynamic Random Access Memory) element and the memory controller and an abnormality of the DRAM which constitute the memory, can be detected.

In this way, data is protected by the above mentioned check code and the ECC in the data transfer operation by the DMA engine 102, but protection of the descriptors is not sufficient. In particular, the address during DMA transfer is not protected, so if a failure is generated in the address line between the memory controller and the memory, the CPU may write a descriptor to an incorrect address or the DMA engine may read a descriptor from an incorrect address.

In this case, data different from original data is DMA-transferred, and as a result data cannot be guaranteed.

SUMMARY OF THE INVENTION

With the foregoing in view, it is an object of the present invention to provide a DMA circuit for protecting the descriptors for DMA transfer and to perform an accurate DMA transfer, and a disk array device using this.

It is another object of the present invention to provide a DMA circuit for detecting a descriptor written in an incorrect address and a descriptor read from an incorrect address for DMA transfer, and a disk array device using this.

It is still another object of the present invention to provide a DMA circuit for detecting the failure of an address line at memory access for DMA transfer, and for preventing an incorrect DMA transfer, and a disk array device using this.

To achieve these objects, the DMA circuit of the present invention is a DMA circuit for reading the descriptors for indicating the DMA transfer content written by a data processing unit, reading data in an address defined by a descriptor from memory, and transferring the data. The DMA circuit includes a first and second registers for storing a top pointer and a bottom pointer of a plurality of descriptors in the memory written by the data processing unit, a transfer circuit for reading the descriptor of the memory indicated by the bottom pointer, analyzing the descriptor, reading the data in an address defined by the descriptor of the memory and transferring the data, and a comparison circuit for comparing the descriptor pointer, included in the read descriptor, and the bottom pointer, and controlling the transfer operation of the transfer circuit.

The disk array device of the present invention includes a plurality of disk devices and a control unit for reading/writing data of the disk device according to a request from a host. The control unit further includes a data processing unit, a cache memory for storing data for the disk device, and a DMA circuit for reading a descriptor to indicate the DMA transfer content written by the data processing unit, reading data in an address defined by a descriptor from the cache memory, and transferring the data. The DMA circuit further includes a first and second registers for storing a top pointer and a bottom pointer of a plurality of descriptors that were written in the cache memory by the data processing unit, a transfer circuit for reading a descriptor of the cache memory indicated by the bottom pointer, analyzing the descriptor, reading the data in an address specified by the descriptor of the cache memory, and transferring the data, and a comparison circuit for comparing the descriptor pointer, included in the read descriptor, and the bottom pointer, and controlling the transfer operation of the transfer circuit.

In the present invention, it is preferable that the transfer circuit accesses the memory where an address line and data line are separated.

In the present invention, it is preferable that the transfer circuit stops the operation of reading data in an address specified by the descriptor in the memory when the comparison result of the comparison circuit is not favorable.

In the present invention, it is preferable that the transfer circuit updates the second register for storing the bottom pointer after data transfer, by reading and analyzing one of the descriptions, completes.

It is preferable that the present invention further includes a second comparison circuit for comparing the top pointer of the first register and the bottom pointer of the second register, and the transfer circuit ends the specified DMA transfer depending on the comparison result of the second comparison circuit.

It is preferable that the present invention further includes a third register for storing the read descriptor, and the comparison circuit compares the descriptor pointer, included in the read descriptor of the third register, and the bottom pointer of the second register.

It is preferable that the present invention further includes a fourth register for storing the base pointer to indicate the base position of the descriptor area of the memory, and the transfer circuit reads the descriptor of the memory indicated by the added value of the bottom pointer of the second register and the base pointer of the fourth register.

In the present invention, it is preferable that the transfer circuit further includes a descriptor read control circuit for requesting the memory to read a descriptor, and a data transfer circuit for requesting the memory to read data according to the read descriptor, and the descriptor read control circuit controls the read request of the data transfer circuit according to the comparison result of the comparison circuit.

In the present invention, it is preferable that the descriptor read control circuit requests the descriptor of the memory indicated by the bottom pointer, and the data transfer circuit analyzes the read descriptor, and reads the data in the address specified by the descriptor of the memory, and transfers the data.

It is preferable that the present invention further includes a third register for storing the read descriptor, and the comparison circuit compares the descriptor pointer, included in the read descriptor of the third register, and the bottom pointer of the second register, and the data transfer circuit analyzes the descriptor of the third register according to the transfer authorization of the descriptor read circuit, reads the data in the address specified by the descriptor of the memory, and transfers the data.

In the present invention, it is preferable that the control unit further includes a channel adapter for communicating with the host, a control circuit having a cache memory for storing a part of the data of the disk device, and a device adapter for communicating with the disk device, and the DMA circuit performs the DMA transfer between the cache memory of the channel adapter and the cache memory of the control circuit.

It is preferable that the present invention further includes a plurality of control units which has a channel adapter for communicating with a host, a control circuit having a cache memory for storing a part of the data of the disk device, and a device adapter for communicating with the disk device, wherein the DMA circuit performs mirroring by the DMA transfer between the cache memory of one of the control units and the cache memory of another one of the control units.

According to the present invention, when a descriptor is created, the data processing unit writes a pointer for storing the descriptor in a predetermined part of the descriptor, and when the DMA engine reads the descriptor, the DMA engine confirms whether the value is correct.

Because of this, if an address failure occurs with the memory when the data processing unit writes a descriptor, or if an address failure occurs when the DMA engine reads a descriptor, the pointer information in the descriptor does not match with the pointer to be read, so it is detected that the read descriptor is abnormal.

In this way, for both the reading and writing of descriptors, data corruption due to an address failure can be prevented. In particular, an address failure of memory where address lines and data lines are separated is detected, and a transfer data error during mirror processing and data transfer processing of the disk array device can be prevented, and a highly reliable system can be constructed.

DESCRIPTION OF THE PREFERRED EMBODIMENTS

Embodiments of the present invention will now be described in the sequence of the first embodiment of the disk array device, DMA transfer circuit, second embodiment of the disk array device and other embodiments, but the present invention is not limited to these embodiments, but can be modified in various ways.

First Embodiment of the Disk Array Device

Figure 1:
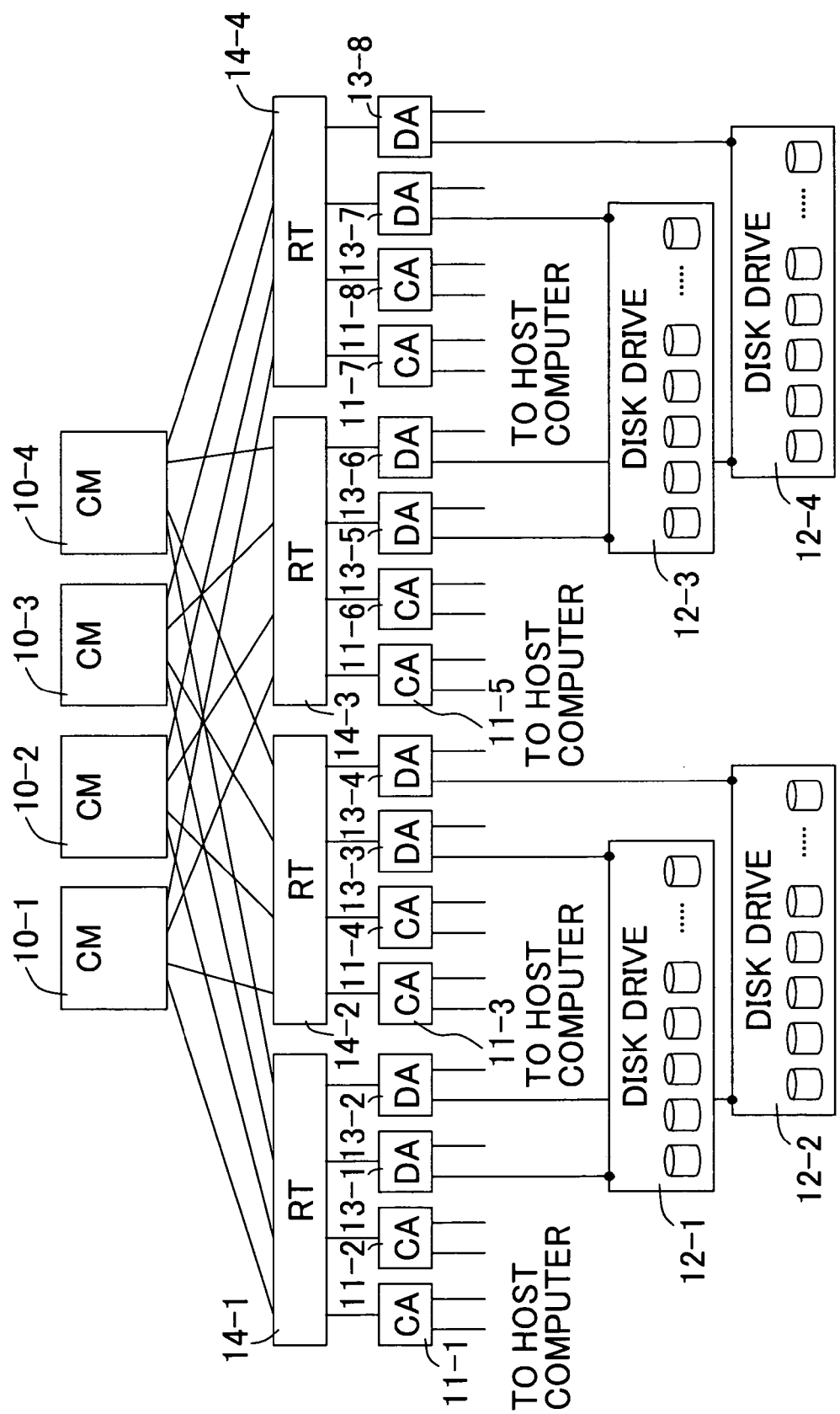
FIG. 1 is a block diagram depicting the configuration of the disk array device according to the first embodiment of the present invention.
Figure 2:
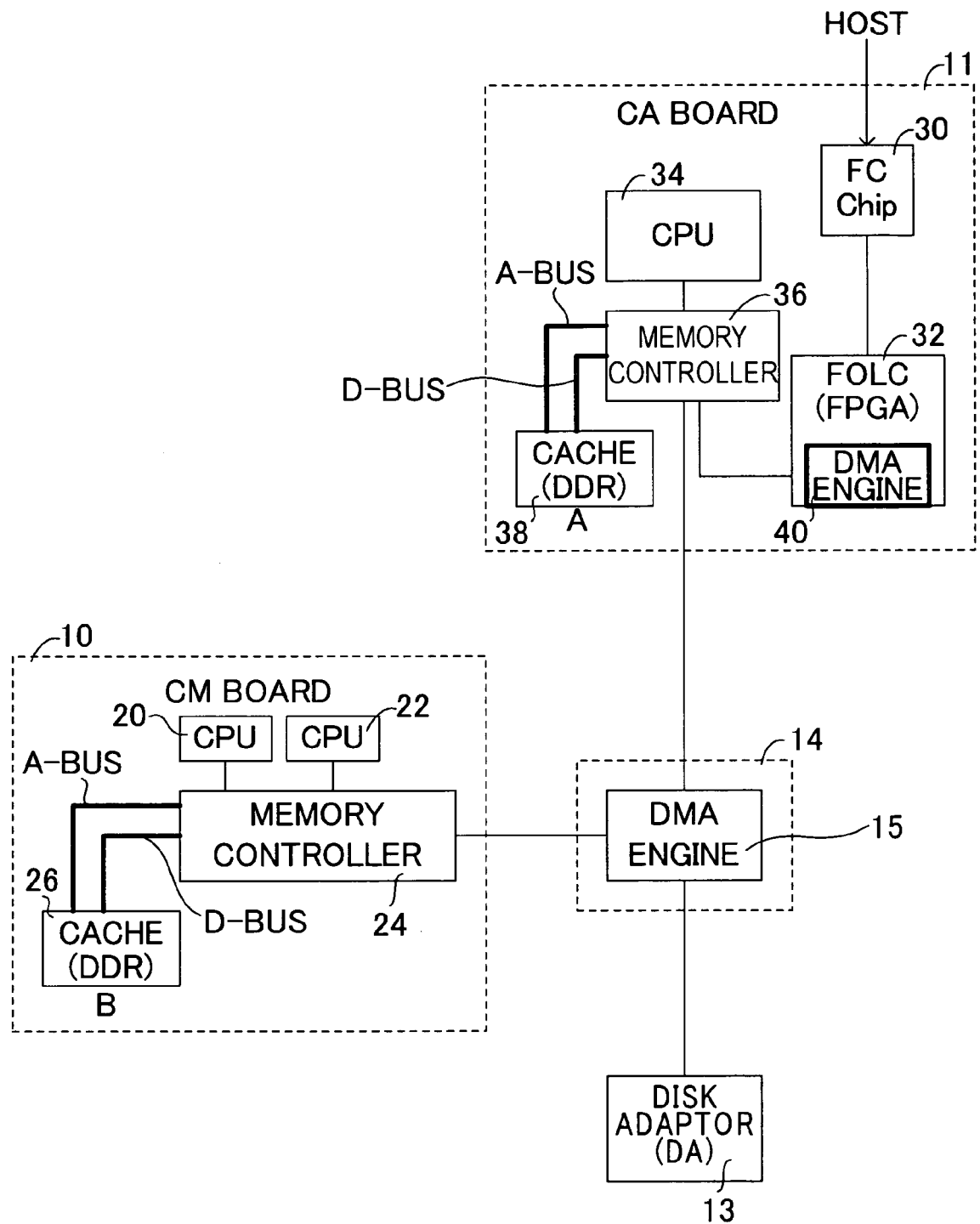
FIG. 2 is a block diagram depicting the configuration of the control module of the embodiment in FIG. 1.

FIG. 1 is a block diagram depicting a general configuration of the first embodiment of the disk array apparatus of the present invention and FIG. 2 is a block diagram depicting details of the major section in FIG. 1.

As FIG. 1 shows, the disk array apparatus includes cache managers ("CM" in FIG. 1) 10-1 to 10-4, which are major units having a cache memory and cache control unit respectively, channel adapters (CA in FIG. 1) 11-1 to 11-8, which are interfaces with the host computer (not illustrated), disk devices 12-1 to 12-4 having a plurality of disk drives, and device adapters (DA in FIG. 1) 13-1 to 13-8, which are interfaces with these disk devices 12-1 to 12-4.

The disk array apparatus further includes routers (RT in FIG. 1) 14-1 to 14-4, which interconnect the cache managers 10-1 to 10-4, channel adapters 11-1 to 11-8 and device adapters 13-1 to 13-8 for performing data transfer and communication among these major units.

This disk array apparatus includes four cache managers, 10-1 to 10-4, and four routers 14-1 to 14-4 corresponding to these cache managers 10-1 to 10-4. Each cache manager 10-1 to 10-4 and each router 14-1 to 14-4 are inter-connected one-to-one. By this, connections among a plurality of cache managers 10-1 to 10-4 are redundant, which increases availability.

In other words, even if one router 14-1 fails, connections among the plurality of cache managers 10-1 to 10-4 are guaranteed by passing through other routers 14-2, 14-3 and 14-4, and even in such a case, the disk array apparatus can continue normal operation.

In this disk array apparatus, two-channel adapters 11-1 to 11-8 and two-disk adapters 13-1 to 13-8 are connected to each router 14-1 to 14-4. Therefore the disk array apparatus has a total of eight adapters 11-1 to 11-8 and a total of eight device adapters 13-1 to 13-8.

These channel adapters 11-1 to 11-8 and device adapters 13-1 to 13-8 can communicate with all the cache managers 10-1 to 10-4 by the inter-connection between cache managers 10-1 to 10-4 and the routers 14-1 to 14-4.

These channel adapters 11-1 to 11-4 are connected to the host computer (not illustrated) which processes the data held in a plurality of disks by a fiber channel or Ethernet (registered trademark), for example. The device adapters 13-1 to 13-8 are connected to the disk drives of the disk devices 12 by fiber channels, for example.

Not only user data from the host computer, but also various information to maintain the consistency of the internal operation of the disk array apparatus (e.g. mirroring processing of data among a plurality of cache memories) is exchanged between the channel adapters 11-1 to 11-8 and cache managers 10-1 to 10-4, and between the device adapters 13-1 to 13-8 and cache managers 10-1 to 10-4.

For this, the cache managers 10-1 to 10-4, channel adapters 11-1 to 11-8 and device adapters 13-1 to 13-8 are connected with the routers 14-1 to 14-4 via interfaces that can implement low latency (faster response speed) than the interfaces between the disk array apparatus with the host computer or with the disk device.

For example, the cache managers 10-1 to 10-4, channel adapters 11-1 to 11-8 and device adapters 13-1 to 13-8 are connected with the routers 14-1 to 14-4 via a bus designed for connecting an LSI (Large Scale Integration) and printed circuit boards, such as a PCI (Peripheral Component inter-connect) bus.

The disk devices 12-1 to 12-4 has two fiber channel ports, and the device adapters 13-1 to 13-8 belonging to different routers 14-1 to 14-4 are connected to each port. Therefore even if the device adapters 13-1 to 13-8 fail, or if the routers 14-1 to 14-4 fail, the connection from the cache managers 10-1 to 10-4 is not disconnected.

Compared with a simple disk device, the reliability of this disk array apparatus is increased by using RAID technology. Also enclosing the cache memory can decrease the data access time.

For RAID technology, such a method as storing the same data in a plurality of disks (RAID-1) or storing parity information distributed among disks (RAID-5) is used to improve reliability. Also most disk array apparatus use a method of guaranteeing data by adding check code to the data, so as to improve reliability.

For example, a CRC (Cyclic Redundancy Code) calculated from data and a block ID to indicate the position information of data are used for a in 512 byte data block. The CRC and the block ID are sometimes collectively called "block check code" (BCC), since these are check codes for a data block.

CRC is calculated using 512 byte data and using a predetermined value called a "seed". The block ID is defined for a first 512 byte data block, and a value incremented by "1" becomes the block ID of the subsequent 512 byte data block.

In the ANSI (American National Standards Institute) standards, BCC is the standard as the check code of a two-byte CRC and six-byte block ID (consists of a two-byte Mega Tag and four-byte Reference Tag) by a name T10 code.

As FIG. 2 shows, the channel adapter 11 (11-1 to 11-8) includes a fiber channel chip 30 for connecting with a host computer, an interface circuit 32 having a DMA engine 40, a CPU 34, a memory controller 36 and a cache memory 38.

The CPU 34 operates the fiber channel chip 30 and the memory controller 36 to perform the later mentioned host interface control and read/write processing with the host.

The cache manager module 10 (10-1 to 10-4) includes two CPUs 20 and 22, a cache memory 26 and a memory controller 24, which also plays the part of a bridge circuit, and performs the later mentioned access processing. The router 14 (14-1 to 14-4), which has a switch function, includes a DMA engine 15. The router 14 is also connected to the device adapter (disk adapter) 13 (13-1 to 13-8).

The cache memories 38 and 26 are comprised of a DRAM (Dynamic Random Access Memory) of DDR (Double Data Rate), of which an address is specified by the address bus A-BUS (e.g. 8 bits), and data is exchanged using the data bus D-BUS.

In the above description, the operation of the disk array apparatus when the host computer stores (writes) data will be described. The data which the host computer stores to the disk is first sent to the channel adapter 11. The channel adapter 11 writes the received data by the FC chip 30 in the cache memory 38 via the interface circuit 32 and the memory controller 36. At this time, the CPU 34 creates the above mentioned descriptor and writes it in the descriptor area in the cache memory 38.

When the data receive from the host completes, the CPU 34 starts up the DMA engine 40, the DMA engine 40 reads the descriptor in the cache memory 38, reads the write data (receive data) in the cache memory 38 according to the address acquired from the descriptor, adds the block check code (BCC) to the data, and transfers it to the memory controller 24 of the cache manager 10 via router 14.

The memory controller 24 stores the transfer data in the cache memory 26 according to the control of the CPUs 20 and 22. Then the memory controller 24 starts up the DMA engine 15, and transfers this data to the memory controller 24 of another cache manager 10, as shown in FIG. 1. By this, the mirroring processing is performed.

When mirroring completes normally, the cache manager 10 notifies this to the channel adapter 11, and the channel adapter 11 notifies the host computer that the storing of data ended normally. Also the cache manager 10 writes back the write data in the cache memory to the magnetic disk device 12-1 in FIG. 1 via the device adapter 13 according to the internal sequence, and stores the data in the magnetic disk device 12-1.

If a read request is issued from the host computer next, the channel adapter 11 receives the read request from the host computer. Then the channel adapter 11, which received the read request, requests the target data of this read request to the cache manager 10 in charge.

If this data exists in the cache memory 26 of this cache manager 10 in charge, the cache manager 10 notifies the address of the cache memory 26 where this target data is held to the channel adapter 11 and the router 14, and instructs the DMA engine 15 of the router 14 to read this data. By this, the router 14 starts up the DMA engine 15, reads the target data of the cache memory 26, and transfers the data to the cache memory 38 of the channel adapter 11. Then the channel adapter 11 starts up the DMA engine 40, and transfers the target data of the cache memory 38 to the host.

If this target data does not exist the cache memory 26 of the cache manager 10 in charge, the cache manager 10 requests the device adapter 13 to read this target data from the disk 12-1, and transfers it to the cache memory 26.

The device adapter 13 reads the target data from the disk 12-1, writes this target data to the cache memory 26, and notifies the cache manager 10 that the writing of the target data ended.

When the cache manager 10 receives the notice that the writing of the target data to the cache memory 26 ended from the device adapter 13, the cache manager 10 notifies the channel adapter 11 that the preparation of the target data is finished, and instructs the router 14 to read the target data.

By this, the router 14 starts up the DMA engine 15, reads the target data of the cache memory 26, and transfers it to the cache memory 38 of the channel adapter 11. Then the channel adaptor 11 starts up the DMA engine 40, and transfers the target data of the cache memory 38 to the host.

When a DRAM is used for the cache memories 26 and 38, an address is sent to the DRAM by the address bus A-BUS, and data is exchanged by the data bus D-BUS, so a high-speed performance is presented. As described above, the data has a check function, such as BCC, but an address in the address bus has no check function. Therefore an address guarantee function is required for DMA transfer.

DMA Circuit

Figure 3:
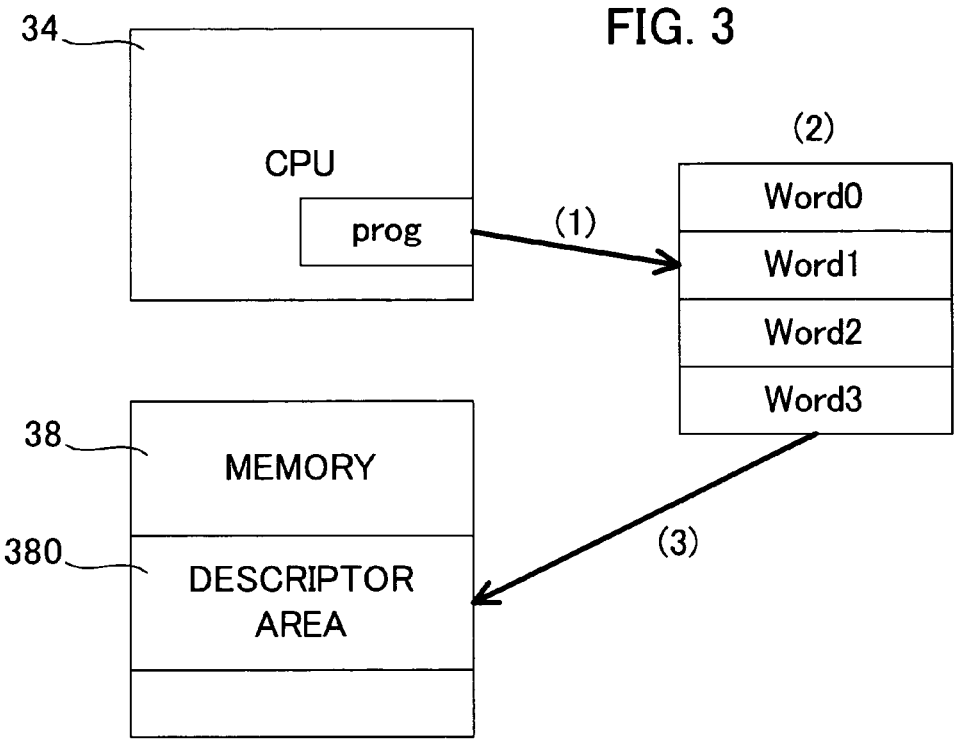
FIG. 3 is a diagram depicting the descriptor write processing according to an embodiment of the present invention.
Figure 4:
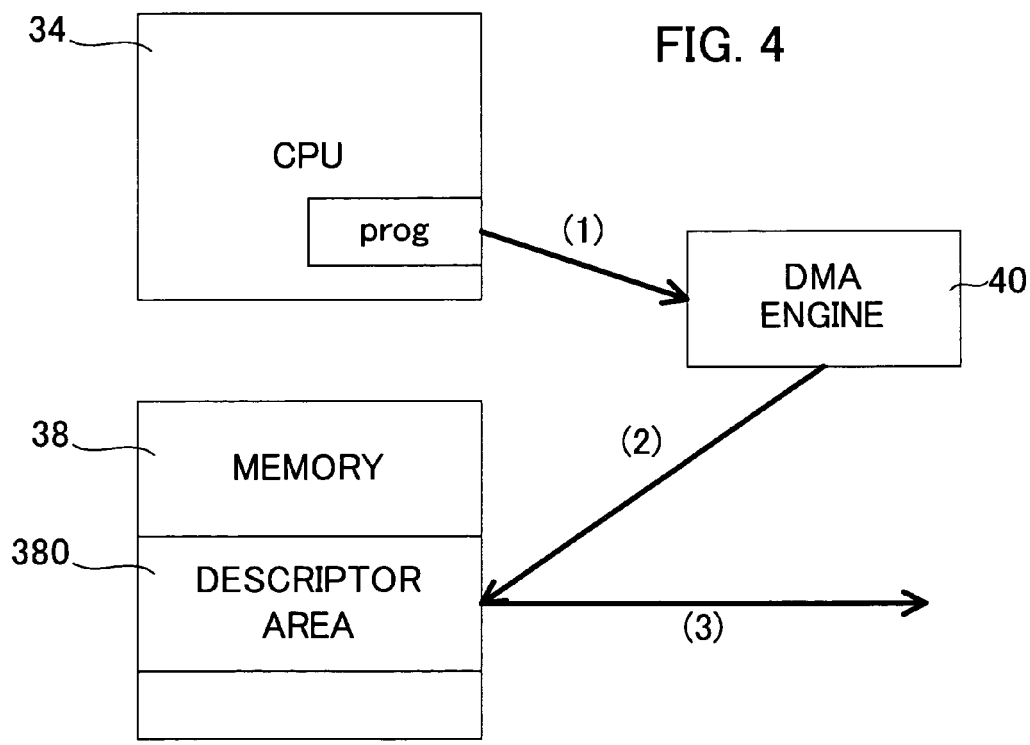
FIG. 4 is a diagram depicting the descriptor read processing according to an embodiment of the present invention.
Figure 5:
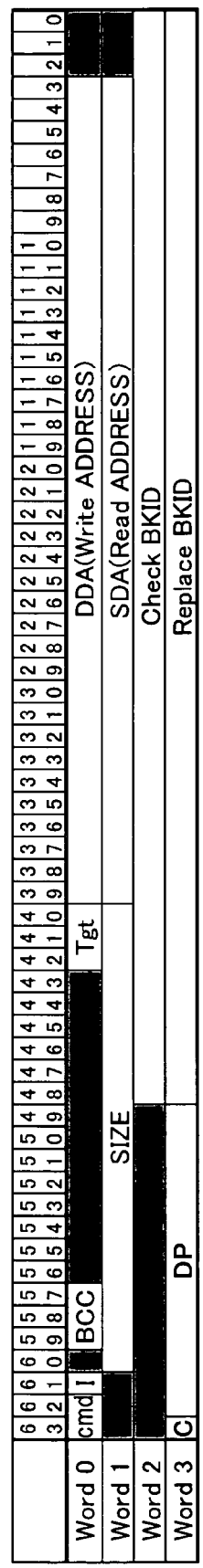
FIG. 5 is a diagram depicting the configuration of the format of the descriptor according to an embodiment of the present invention.

FIG. 3 is a diagram depicting the descriptor write operation for explaining the DMA transfer according to an embodiment of the present invention, FIG. 4 is a diagram depicting the descriptor read operation for explaining the DMA transfer according to an embodiment of the present invention, and FIG. 5 is a diagram depicting the format of the descriptor according to an embodiment of the present invention.

FIG. 3 and FIG. 4 show an example when the DMA circuit 40 of the channel adapter 11 in FIG. 2 DMA-transfers the data of the cache memory 38 to the cache memory 26 of the cache manager 10.

As FIG. 3 shows, in the case of the descriptor write operation, (1) the CPU 34 starts up the descriptor program, and creates the descriptor by executing this program (2). At this time, the CPU 34 writes the descriptor pointer information, which indicates the number of the descriptor, into a part of the descriptor, as described later. (3) And the CPU 34 writes the created descriptor to the descriptor area 380 of the memory 38.

In the case of the descriptor read operation, (1) the CPU 34 starts up the DMA program, and (2) the DMA engine 40 is started up by executing this program, as FIG. 4 shows. The DMA engine 40 reads the descriptor from the descriptor area 380 of the memory 38 (3).

Figure 9:
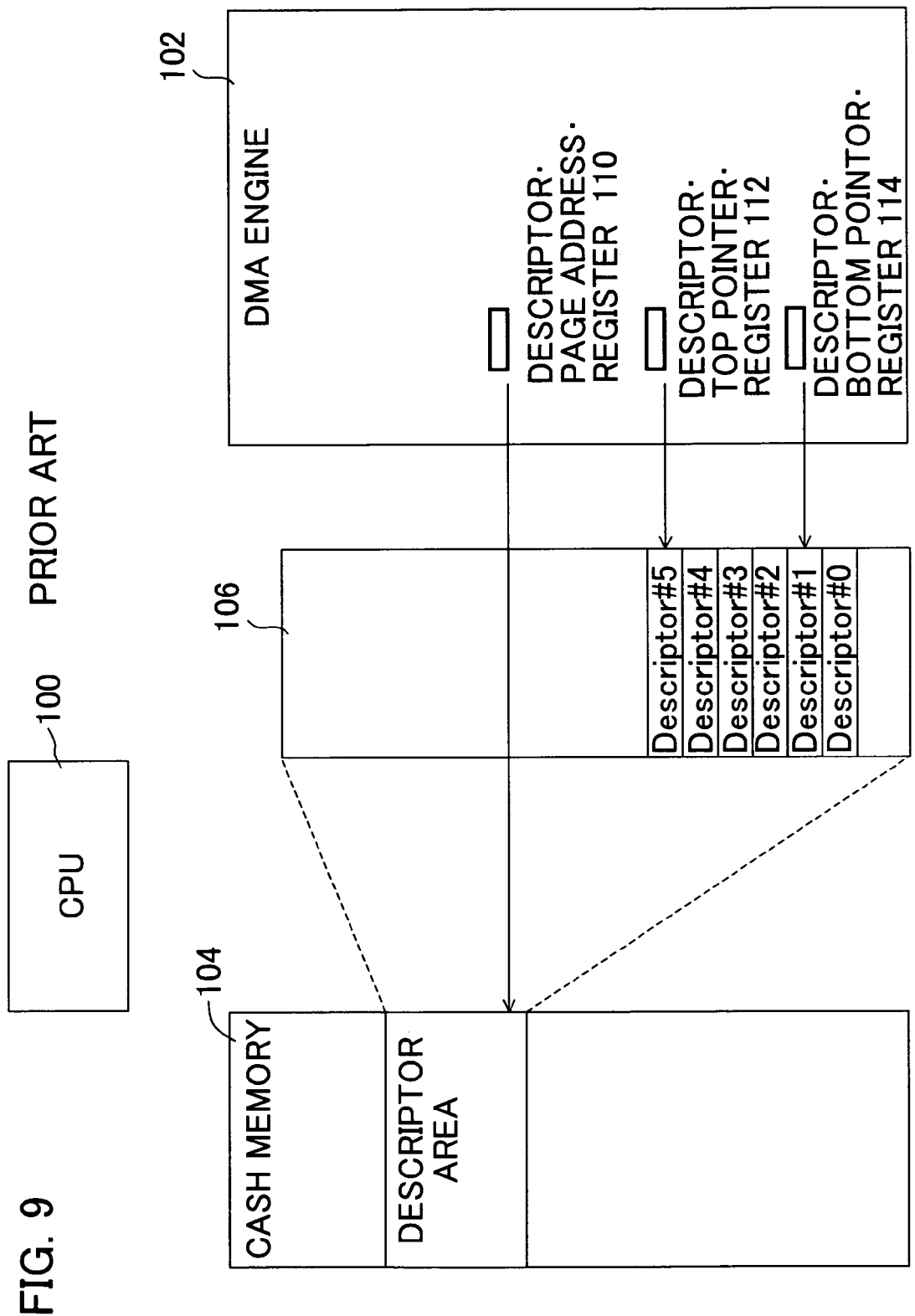
FIG. 9 is a diagram depicting a conventional DMA transfer.
Figure 10:
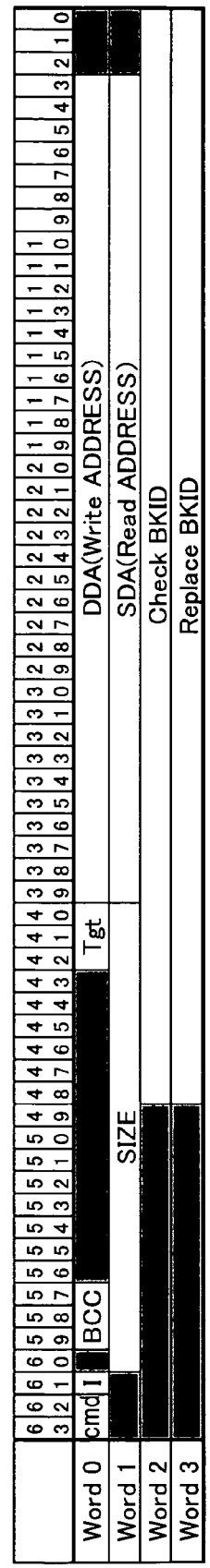
FIG. 10 is a diagram depicting the configuration of the format of a conventional descriptor.

After this reading, the DMA engine 40 compares the descriptor pointer information written by the CPU 34 with the value of the descriptor bottom pointer register 110 (see FIG. 9) which indicates the number of the descriptor used for reading. And if these values are different, the DMA engine 40 judges that this descriptor is invalid, and stops DMA processing.

The DMA engine 40 also compares the carry information of the descriptor pointer, which the CPU 34 has written in a part of the descriptor, with the carry bit of the descriptor bottom pointer register 110. And if these are different, the DMA engine 40 judges that this descriptor is invalid, and stops DMA processing.

In other words, the descriptor area 380 is used as a circular buffer, so when the descriptor area, which is N times the descriptor size, is used up, the descriptor area 380 is used from the initial position.

At this time "0" is specified as the carry information of the descriptor pointer for the first cycle, and for the second and later cycles, the carry information is updated as "1"→"0"→"1" each time the descriptor area is newly used.

An example of the format of the descriptor will be described with reference to FIG. 5. As mentioned above, the descriptor is a DMA transfer instruction for the CPU 34 to send to the DMA engine 40, and includes the address and the number of bytes in the cache memory 104, and the address of the data transfer destination (memory) of the data to be transferred. For example, as the format of the descriptor in FIG. 5 shows, the descriptor is comprised of a four word (one word, 64 bits) command. The first word is comprised of the command field cmd, an interrupt control field (e.g. "1" indicates the generation of an interrupt at the end of this descriptor), the BCC check mode BCC, the transfer destination node Tgt, and the transfer destination (Write Side) memory address DDA.

The second word is comprised of the number of transfer bytes SIZE (e.g. max. 1 Mbytes, min. 8 bytes), and the transfer source (Read Side) memory address SDA. The third word is the Block-ID initial value for checking Check BKID, and the fourth word is the Block-ID initial value for generation (Replace). According to the embodiment of the present invention, the descriptor pointer information DP and the carry information C thereof are disposed in the fourth word (Word 3).

Each time data is written to the cache memory 38, the CPU 34 creates a descriptor, as shown in FIG. 5, that is a descriptor including the pointer value DP for storing the descriptor and the carry information C, and writes it in the descriptor area 380 in the cache memory 38.

The CPU 34 also writes the first address of the descriptor area 380 in the descriptor base address register (48 in FIG. 6) of the DMA engine 38. By this, the DMA engine 38 can know what part of the descriptor area 380 of the cache memory 38 the descriptor will be written to.

In this way, when the descriptor is created, the CPU writes the value of the pointer and the carry information for storing the descriptor to a predetermined part of the descriptor, and when the DMA engine reads the descriptor, the DMA engine confirms whether the value is correct.

By this, if an address failure occurs between the memory controller 36 and the memory 38 when the CPU 34 writes the descriptor, the carry information which is supposed to be updated is not updated, so the DMA engine 40 can detect the invalidity when this descriptor is read.

If an address failure occurs when the DMA engine 40 reads the descriptor, the pointer information in the descriptor does not match the pointer to be read, so the read descriptor can be detected as abnormal.

In this way, for both writing and reading of a descriptor, data corruption due to an address failure can be prevented.

Figure 6:
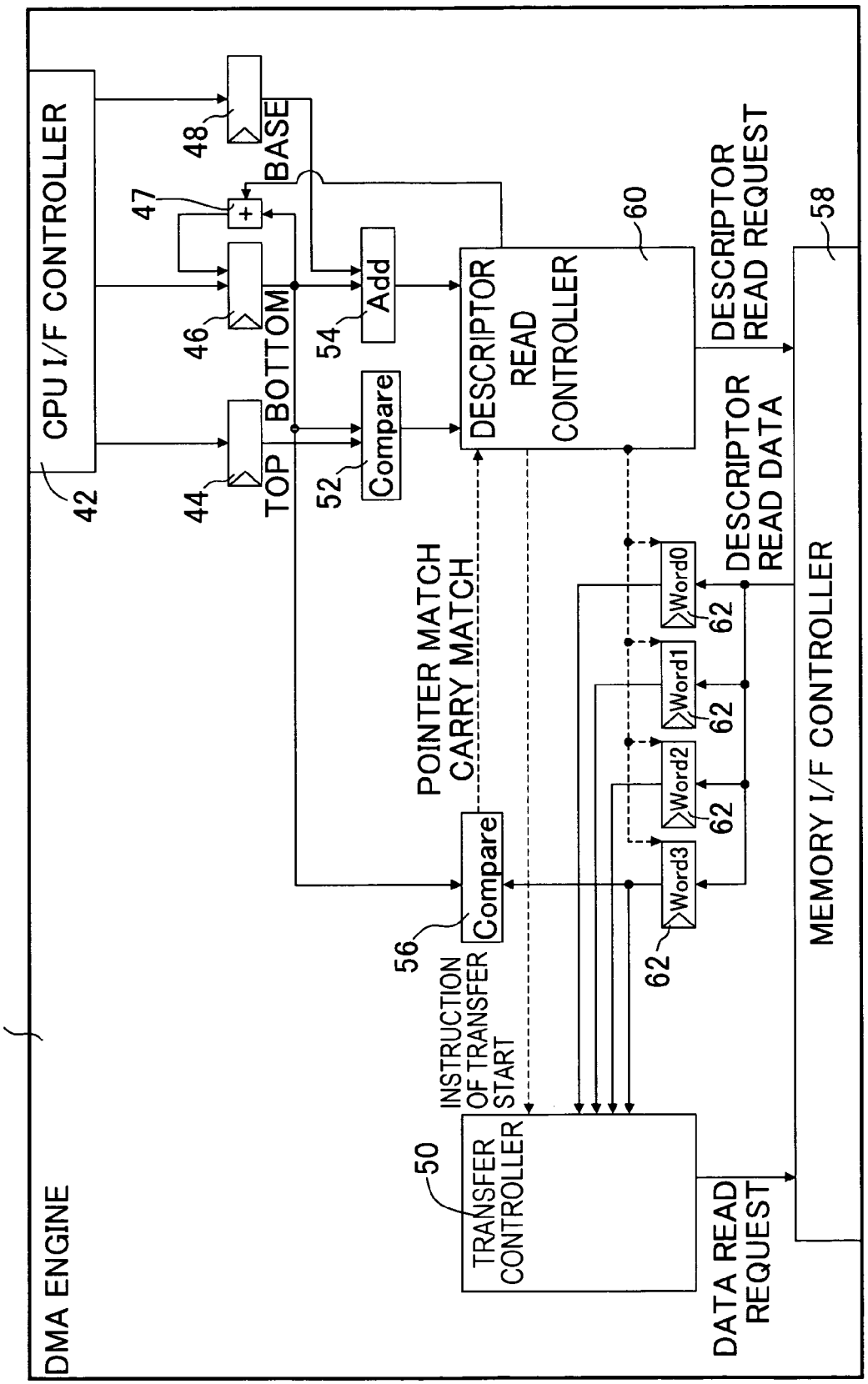
FIG. 6 is a block diagram depicting the configuration of the DMA circuit according to an embodiment of the present invention.

FIG. 6 is a circuit diagram of an embodiment of the DMA engine having such a detection function according to the present invention. As FIG. 6 shows, the DMA engine 40 is comprised of a CPU I/F control unit 42, memory I/F control unit 58, descriptor read control unit 60 and data transfer control unit 50.

The DMA engine 40 is further comprised of a descriptor base address register 48, descriptor top pointer register 44, descriptor bottom pointer register 46 and descriptor store register 62.

Also the DMA engine 40 is further comprised of an adder 47 for incrementing the point value of the descriptor bottom register 46 by "1" when transfer complete, an adder 54 for adding the base address of the register 48 and the bottom pointer of the register 46, a first comparator 52 for comparing the top pointer of the register 44 with the bottom pointer of the register 46, and a second comparator 56 for comparing the pointer DP and the carry bit C (Word 3) in the descriptor which was read into the register 62 with the bottom pointer of the register 46.

The number of bits of the descriptor top pointer register 44 is determined according to the number of descriptors to be stored in the cache memory 38. If 1024 descriptors are stored, for example, 10 bits are required for the top pointer register 44. The number of bits of the descriptor bottom pointer register 46 is a value when one bit of the carry is added to the number of bits of the top pointer register 44.

The operation of this configuration will be described. When the CPU 34 starts up the DMA engine 40, the set values of each register 44, 46 and 48 on the base address, top pointer and bottom pointer are received through the CPU I/F control unit 42, and the values of each register 44, 46 and 48 are rewritten to specified values respectively.

When the first comparator 52 detects that the value of the top pointer and the value of the bottom pointer are different, the descriptor read control unit 60 judges that the descriptor to be executed exists on the cache memory 38, and instructs the memory I/F control unit 58 to read one descriptor pointed to by the bottom pointer from the memory 38. At this time, the address on the memory 38 of the descriptor to be read is acquired by the adder 54 adding the bottom pointer to the base address, and this address, as the read address, is sent to the address bus A-BUS with the cache memory 38 via the memory I/F control unit 58.

By this, the descriptor data is returned from the memory 38 to the memory I/F control unit 58 via the data bus D-BUS, and is stored into the descriptor store register 62 in the sequence of word 0, 1, 2, 3, as described in FIG. 5.

When all the descriptors are received, the second comparator 56 compares the pointer DP and carry bit C specified in the descriptor of the register 62 with the value of the bottom pointer register 46. The comparison result is notified to the descriptor read control unit 60.

If the comparison result by the second comparator 56 is a match, the descriptor read control unit 60 instructs the data transfer control unit 50 to transfer the data by this descriptor. The data transfer control unit 50 outputs the data read request to the memory 38 via the memory I/F control unit 58 according to the descriptor in the descriptor store register 62, reads the transfer data from the memory 38, and transfers the read data to the specified transfer destination.

The transfer control unit 50 operates the adder 47 via the descriptor read control unit 60 when transfer completes, increments the bottom pointer of the bottom register 46 by "1", and updates the bottom register 46. The descriptor read control unit 60 repeats this until the comparison result of the first comparator 52 match (that is, the value of the top register 44 and the value of the bottom register 46 match).

If the comparison result of the second comparator 56 is a mismatch, the descriptor read control unit 60 stops data transfer by this descriptor (that is, does not instruct the transfer control unit 50 to start transfer), and notifies the error to the CPU 34 by an interrupt.

An example of a cause of a mismatch of the comparison result is that an abnormality (e.g. disconnection) occurs to the address bus A-BUS with the cache memory 38 when the descriptor is written from the CPU 34 to the cache memory 38 or the descriptor is read by the DMA engine 40 from the cache memory 38, therefore an address cannot be correctly transferred.

In particular, when DRAM is used for the cache memory 38, the address bus and the data bus are separated, and check information does not exist in the address on the address bus, so the present invention is effective to prevent a data error of such a DMA transfer.

Second Embodiment of Disk Array Apparatus

Figure 7:
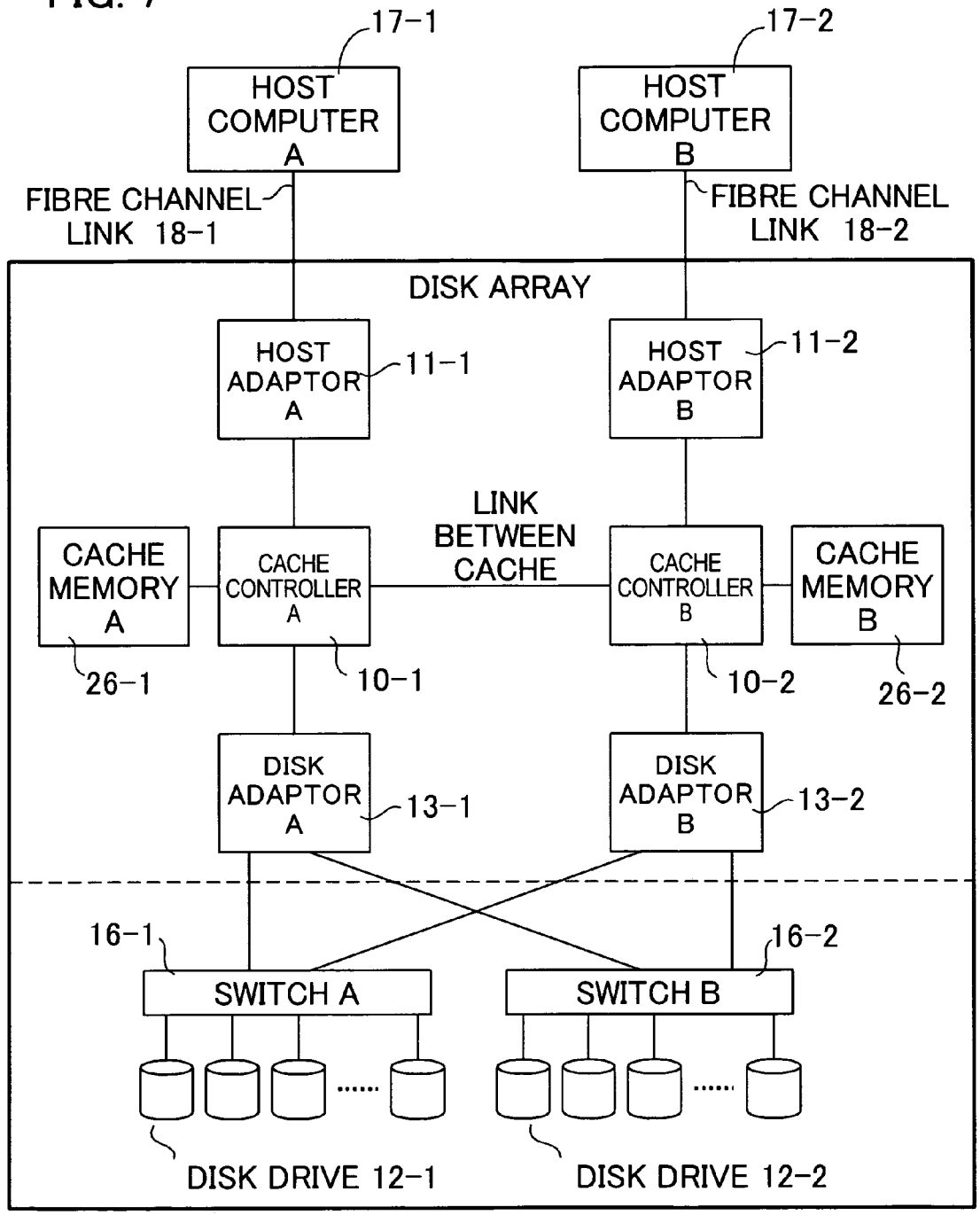
FIG. 7 is a block diagram depicting the configuration of the disk array device according to the second embodiment of the present invention.
Figure 8:
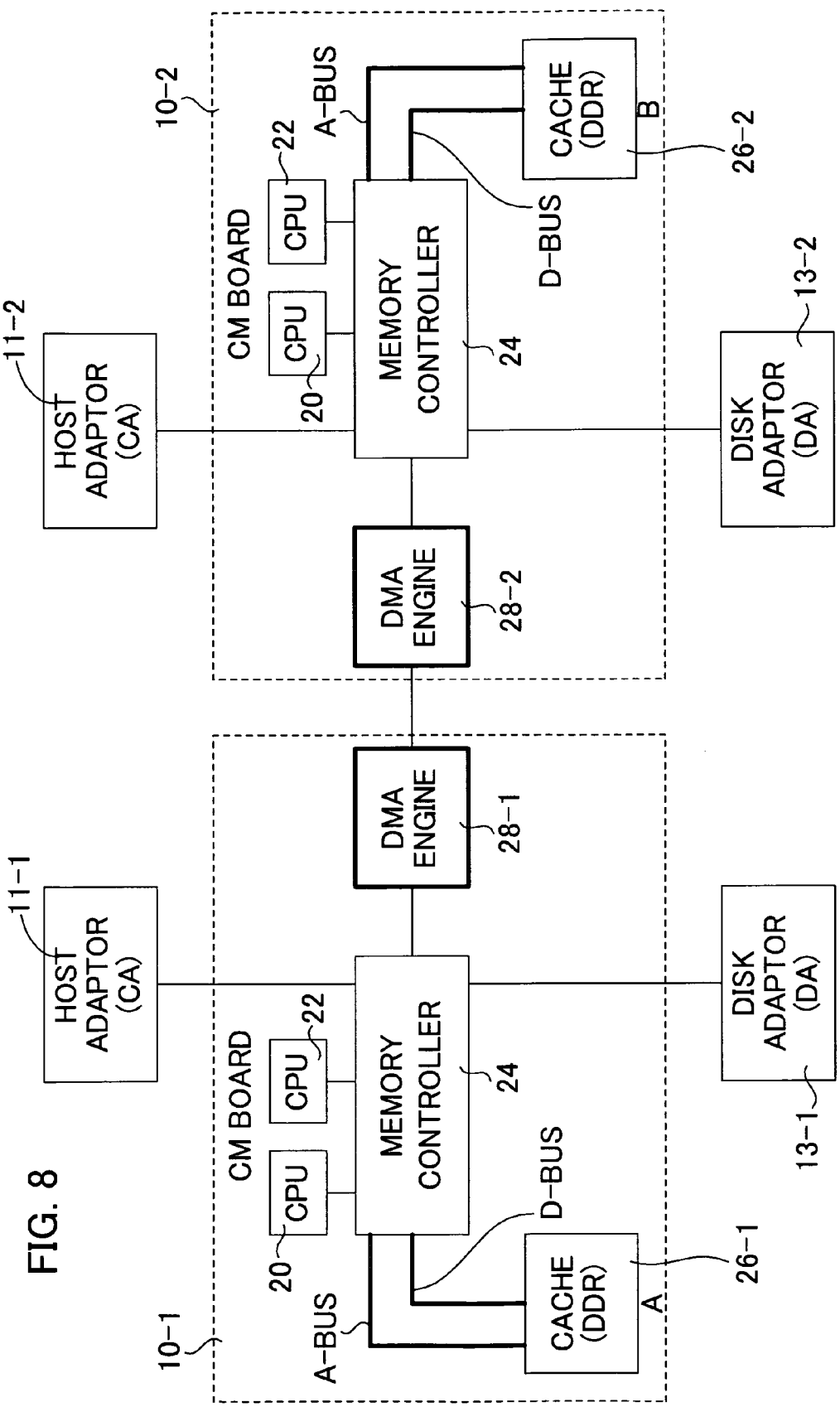
FIG. 8 is a block diagram depicting the configuration of the control module of the embodiment in FIG. 7.

FIG. 7 is a block diagram depicting the second embodiment of the disk array apparatus according to the present invention, and FIG. 8 is a block diagram depicting details of the major section thereof. As FIG. 7 shows, the disk array apparatus is connected to two host computers 17-1 and 17-2 by the fiber channel links 18-1 and 18-2.

The disk array apparatus is comprised of the host adapters 11-1 and 11-2 which are in charge of the host interface, cache memories 26-1 and 26-2, cache controllers 10-1 and 10-2 for managing the cache memories 26-1 and 26-2, and disk adapters 13-1 and 13-2 which are in charge of the disk interfaces.

The host adapters 11-1 and 11-2, cache memories 26-1 and 26-2, cache controllers 10-1 and 10-2 and disk adapters 13-1 and 13-2 are the same as the channel adapters, cache managers and device adapters in FIG. 1 respectively.

The disk array apparatus is further comprised of the switches 16-1 and 16-2 which provide connection between the disk adapters 13-1 and 13-2 and a plurality of disk drives, and the disk drive groups 12-1 and 12-2.

The cache controllers 10-1 and 10-2 provide data transfer paths between the host adapters 11-1 and 11-2 and the disk adapters 13-1 and 13-2. A data transfer path is also disposed between the cache controllers 10-1 and 10-2, which is used for mirroring the data of the cache memories 26-1 and 26-2.

As described above, the cache memories 26-1 and 26-2 are volatile memories, such as DRAM, so for data to be stored in one cache memory 26-1 or 26-2, a copy thereof is always stored in the other cache memory 26-2 or 26-1. By this copy operation, the loss of data is prevented when a failure occurs. This is called the "mirroring of the cache".

As described later in FIG. 8, each cache controller 10-1 and 10-2 has a DMA engine for mirroring, and can transfer the data stored in the cache memory 26-1 or 26-2 to the memory of another cache controller according to the instruction of the CPU in the cache controller 10-1 or 10-2.

The operation of storing the data of the host computer using the disk array apparatus having this configuration will be described. The data of which the host computer 17-1 (or 17-2) stores to the disk is first transmitted to the host adapter 11-1. The host adapter 11-1 adds the block check code (BCC) to the received data, and transfers it to the cache controller 10-1.

The cache controller 10-1 stores the transferred data to the cache memory 26-1, then starts up the DMA engine and transfers this data to the cache controller 10-2. The cache controller 10-2 stores the transferred data into the cache memory 26-2. By this, the mirroring processing is performed.

When the mirroring completes normally, the cache controller 10-1 notifies this to the host adapter 11-1, and the host adapter 11-1 notifies the host computer 17-1 that the storing the data ended normally.

The write back to the disk drive groups 12-1 and 12-2 in the cache memories 26-1 and 26-2 and the read operation from the host computer are the same as FIG. 1 and FIG. 2.

As FIG. 8 shows, the cache controller 10-1 or 10-2 functions as a bridge circuit, where the CPUs 20 and 22 and the DMA engine 28-1 or 28-2 are connected with the memory controller 24 for controlling the memory at the center. A plurality of CPUs may be installed, as FIG. 8 shows, or only one CPU is installed depending on the performance requirements for a CPU. The CPUs 20 and 22 and the DMA engines 28-1 and 28-2 can access the cache memories 26-1 and 26-2 via the memory controller 24.

The DMA engines 28-1 and 28-2 have an interface outside the cache controllers 10-1 and 10-2, and are connected to other cache controllers. The host adapters 11-1 and 11-2 and the disk adapters 13-1 and 13-2 are connected to the memory controller 24, and can access the cache memories 26-1 and 26-2 respectively.

After receiving the data (write data) from the host computer 17-1 or 17-2, the CPUs 20 and 22 in the cache controller 10-1 or 10-2 judge whether the mirroring of data is started. According to this configuration, as illustrated in FIG. 3, when the CPUs 20 and 22 receive data from the host, the CPUs 20 and 22 create a descriptor in the control area (descriptor area) in the cache memory 26-1 or 26-2.

As described in FIG. 5, the descriptor is a command for the CPUs 20 and 22 to send the DMA transfer instruction to the DMA engines 28-1 and 28-2, and is comprised of a command field, interrupt control field, transfer source memory address, transfer destination memory address, transfer data byte length, Block-ID initial value for checking, Block-ID initial value for generation, carry information and descriptor pointer.

As described in FIG. 4 and FIG. 6, the DMA engines 28-1 and 28-2 have the same configuration as FIG. 6, where the first address of the descriptor area is written in the descriptor base address register 48, and comprise the descriptor top pointer register 44 and descriptor bottom pointer register 46. These registers indicate how many descriptors the CPU prepared in the descriptor area, and how many descriptors the DMA engine completed execution.

When the DMA engines 28-1 and 28-2 read the descriptors, analyze them, and complete the specified data transfer, the DMA engines 28-1 and 28-2 increment the descriptor bottom pointer register 46 by "1".

According to the present embodiment, the check function in FIG. 5 and FIG. 6 is attached to the DMA transfer for mirroring. In other words, during the mirroring operation, which is performed to increase the reliability of data, data must not be corrupted.

Therefore the storage apparatus normally guarantees the data by attaching the check code as mentioned above, and the cache memory itself has ECC code for the data, so that the corruption of data due to an abnormality of the DRAM element constituting the memory or an abnormality of the data path between the memory controller and the DRAM can be detected, and mirroring is stopped if an abnormality is detected.

In the mirroring operation by the DMA engine, the data is protected by the above mentioned check code and ECC, but the protection of descriptors is not sufficient. So if a failure occurs to the address line between the memory controller and the memory, for example, the CPU may write a descriptor in an incorrect address or the DMA engine may read a descriptor read from an incorrect address.

In this case, data different from original data may be written in another cache memory or data may be mirrored at an address different from the target address of the cache memory, and as a result, the data is not correctly mirrored, and data on the cache is not guaranteed.

Therefore even in a DMA transfer for mirroring the abnormality detection function of the descriptor, described in FIG. 5 and FIG. 6, is effective for accurate mirroring. In other words, when the CPU creates a descriptor, the CPU writes the value of the pointer for storing the descriptor and the carry information in a predetermined part of the descriptor, and when the DMA engine reads the descriptor, the DMA engine confirms whether the value is correct.

If an address failure occurs between the memory controller and the memory when the CPU writes the descriptor, the carry information, which is supposed to be updated, is not updated, so the DMA engine can detect this descriptor as invalid when it is read.

If an address failure occurs when the DMA engine reads the descriptor, the pointer information in the descriptor does not match the pointer to be read, so the read descriptor is detected as abnormal. In this way, for both writing and reading of the descriptor, data corruption due to an address failure (e.g. disconnection of address line, failure of address line driver) can be prevented.

According to the present embodiment, when the data to be stored in the cache memory is mirrored, DMA transfers of the data using an invalid descriptor can be prevented, and the reliability of the device can be increased.

Other Embodiments

The present invention is not limited to the above mentioned embodiments, but can be modified in various ways within the scope of the essential character of the present invention. For example, in the above embodiments, a magnetic disk device was described for the storage unit for storing the data as an example, but the present invention is not limited to this, but the storage medium in the storage unit may be applied to an optical disk or magneto-optical disk.

In the first embodiment, the DMA transfer of write data from the channel adapter to the control module was described, but the present invention can be applied to the DMA transfer of read data and the DMA transfer for mirroring.

The number of each composing element (disk devices, host computers, control modules, cache managers, channel adapters and DMA engines) and the number of ports which each of these units has are not limited in the present invention, and may be changed or combined as required.

The DMA transfer circuit was described as applied to the above mentioned disk array apparatus, but may also be applied to other data processing devices, and the target memory also is not limited to the cache memory.

When a descriptor is created, the data processing unit writes a pointer to store the descriptor to a predetermined part of the descriptor, and when the DMA engine reads the descriptor, the DMA engine confirms whether the value is correct, so data corruption due to an address failure can be prevented for both writing and reading of the descriptor. In particular, an address failure can be detected for memory in which the address line and data line are separated, and an error of transferred data in the mirroring processing and the data transfer processing of the disk array device can be prevented, therefore a highly reliable system can be constructed.

What is claimed is:

1. A DMA circuit for reading descriptors for indicating DMA transfer content written by a data processing unit, reading data in an address defined by a descriptor from memory, and transferring the data, comprising:
a first register for storing a top pointer which indicates a top descriptor written in said memory by said data processing unit;
a second register for storing a bottom pointer which indicates a position of a next target descriptor of the DMA transfer in a plurality of DMA transfer descriptors in said memory written by said data processing unit;
a transfer circuit for reading the next target descriptor indicated by said bottom pointer from said plurality of DMA transfer descriptors in said memory, each of said plurality of DMA transfer descriptors being written to said memory by adding a descriptor pointer indicating a descriptor number in each of said plurality of DMA transfer descriptors, analyzing the next target descriptor thus read, reading data in an address specified by said next target descriptor of said memory, and transferring the data; and
a comparison circuit for comparing said descriptor pointer indicating the descriptor number written in the read next target descriptor by the data processing unit and said bottom pointer, and controlling the transfer operation of said transfer circuit;
wherein said transfer circuit updates the second register for storing said bottom pointer after completing a data transfer by reading and analyzing one of the descriptors.

2. The DMA circuit according to claim 1, wherein said transfer circuit accesses said memory where an address line and data line are separated.

3. The DMA circuit according to claim 1, wherein said transfer circuit stops the operation of reading data in an address specified by said next target descriptor in said memory when a comparison result of said comparison circuit is not favorable.

4. The DMA circuit according to claim 1, further comprising a second comparison circuit for comparing the top pointer of said first register and the bottom pointer of said second register,
and said transfer circuit ends the specified DMA transfer depending on a comparison result of said second comparison circuit.

5. The DMA circuit according to claim 1, further comprising a third register for storing said read next target descriptor,
and said comparison circuit compares the descriptor pointer indicating the descriptor number included in said read next target descriptor of said third register and said bottom pointer of said second register.

6. The DMA circuit according to claim 1, further comprising a fourth register for storing a base pointer to indicate a base position of the descriptor area of said memory,
wherein said transfer circuit reads the next target descriptor of said memory indicated by the added value of said bottom pointer of said second register and the base pointer of said fourth register.

7. The DMA circuit according to claim 1, wherein said transfer circuit further comprises:
a descriptor read control circuit for requesting said memory to read said next target descriptor; and
a data transfer circuit for requesting said memory to read data according to said read next target descriptor,
and wherein said descriptor read control circuit controls the read request of said data transfer circuit according to a comparison result of said comparison circuit.

8. The DMA circuit according to claim 7, wherein said descriptor read control circuit requests the next target descriptor of said memory, indicated by said bottom pointer, to said memory,
and wherein said data transfer circuit analyzes said read next target descriptor, reads the data in said address specified by said next target descriptor of said memory, and transfers the data.

9. The DMA circuit according to claim 7, further comprising a third register for storing said read descriptor,
wherein said comparison circuit compares a descriptor pointer indicating the descriptor number included in said read next target descriptor of said third register, and said bottom pointer of said second register,
and wherein said data transfer circuit analyzes said next target descriptor of said third register according to a transfer authorization of said descriptor read circuit, reads the data in said address specified by said next target descriptor of said memory, and transfer the data.

10. The DMA circuit according to claim 1, wherein said transfer circuit reads the next target descriptor indicated by said bottom pointer from said plurality of DMA transfer descriptors, in a descriptor area of said memory, said descriptor area being used as a circular buffer and said next target descriptor being added to said descriptor pointer indicating the descriptor number and a carry information which is updated each time the descriptor area is newly used by the circular buffer, and
said comparison circuit compares said carry information written in the read next target descriptor by the data processing unit and a carry information of said bottom pointer to detect error of said next target descriptor.

11. A disk array apparatus comprising:
a plurality of disk devices; and a control unit for reading/writing data of said disk device according to a request from a host,
wherein said control unit comprises:
a data processing unit;
a cache memory for storing data for said disk device; and
a DMA circuit for reading a descriptor to indicate DMA transfer content written by said data processing unit, reading the data in an address defined by a descriptor from said cache memory, and transferring the data,
and wherein said DMA circuit comprising:
a first register for storing a top pointer which indicates a top descriptor written in said cache memory by said data processing unit;
a second register for storing a bottom pointer which indicates a position of a next target descriptor of the DMA transfer in a plurality of DMA transfer descriptors in said cache memory written by said data processing unit;
a transfer circuit for reading the next target descriptor indicated by said bottom pointer from said plurality of DMA transfer descriptors in said cache memory, each of said plurality of DMA transfer descriptors being written to said cache memory by adding a descriptor pointer indicating a descriptor number in each of said plurality of DMA transfer descriptors, analyzing the next target descriptor thus read, reading data in an address specified by said next target descriptor of said cache memory, and transferring the data; and
a comparison circuit for comparing said descriptor pointer indicating the descriptor number written in the read next target descriptor by the data processing unit and said bottom pointer, and controlling the transfer operation of said transfer circuit;
wherein said transfer circuit updates the second register for storing said bottom pointer after completing a data transfer by reading and analyzing one of the descriptors.

12. The disk array apparatus according to claim 11, wherein said transfer circuit accesses said cache memory where an address line and data line are separated.

13. The disk array apparatus according to claim 11, wherein said transfer circuit stops the operation of reading data in an address specified by said next target descriptor in said cache memory when a comparison result of said comparison circuit is not favorable.

14. The disk array apparatus according to claim 11, further comprising a second comparison circuit for comparing the top pointer of said first register and the bottom pointer of said second register,
and wherein said transfer circuit ends the specified DMA transfer depending on a comparison result of said second comparison circuit.

15. The disk array apparatus according to claim 11, further comprising a third register for storing said read next target descriptor,
and wherein said comparison circuit compares the descriptor pointer indicating the descriptor number included in said read next target descriptor of said third register and said bottom pointer of said second register.

16. The disk array apparatus according to claim 11, further comprising a fourth register for storing the base pointer to indicate a base position of the descriptor area of said cache memory,
wherein said transfer circuit reads the next target descriptor of said cache memory indicated by the added value of said bottom pointer of said second register and the base pointer of said fourth register.

17. The disk array apparatus according to claim 11, wherein said transfer circuit further comprises:
a descriptor read control circuit for requesting said cache memory to read said next target descriptor; and
a data transfer circuit for requesting said cache memory to read data according to said read next target descriptor,
and wherein said descriptor read control circuit controls the read request of said data transfer circuit according to a comparison result of said comparison circuit.

18. The disk array apparatus according to claim 11, wherein said control unit further comprises:
a channel adapter for communicating with said host;
a control circuit having said cache memory for storing a part of the data of said disk device; and
a device adapter for communicating with said disk device,
and wherein said DMA circuit performs said DMA transfer between a cache memory of said channel adapter and said cache memory of said control circuit.

19. The disk array apparatus according to claim 11, further comprising a plurality of said control units each of which includes a channel adapter for communicating with said host, a control circuit having said cache memory for storing a part of the data of said disk device, and a device adapter for communicating with said disk device,
wherein said DMA circuit performs mirroring by said DMA transfer between said cache memory of one of said control units and said cache memory of another one of said control units.

20. The disk array apparatus according to claim 11, wherein said transfer circuit reads the next target descriptor indicated by said bottom pointer from said plurality of DMA transfer descriptors, in a descriptor area of said cache memory, said descriptor area being used as a circular buffer and said next target descriptor being added to said descriptor pointer indicating the descriptor number and a carry information which is updated each time the descriptor area is newly used by the circular buffer, and
said comparison circuit compares said carry information written in the read next target descriptor by the data processing unit and a carry information of said bottom pointer to detect error of said next target descriptor.

* * * * *